US010452347B2

(12) United States Patent
Onohara et al.

(10) Patent No.: US 10,452,347 B2
(45) Date of Patent: Oct. 22, 2019

(54) INFORMATION PROCESSING DEVICE, INFORMATION PROCESSING METHOD, AND TERMINAL DEVICE FOR GENERATING INFORMATION SHARED BETWEEN THE INFORMATION PROCESSING DEVICE AND THE TERMINAL DEVICE

(71) Applicant: SONY CORPORATION, Minato-ku (JP)

(72) Inventors: Takashi Onohara, Tokyo (JP); Roka Ueda, Tokyo (JP); Keishi Daini, Kanagawa (JP); Taichi Yoshio, Kanagawa (JP); Yuji Kawabe, Tokyo (JP); Seizi Iwayagano, Chiba (JP); Takuma Higo, Tokyo (JP); Eri Sakai, Saitama (JP)

(73) Assignee: Sony Corporation, Tokyo (JP)

( * ) Notice: Subject to any disclaimer, the term of this patent is extended or adjusted under 35 U.S.C. 154(b) by 100 days.

(21) Appl. No.: 14/379,888

(22) PCT Filed: Mar. 15, 2013

(86) PCT No.: PCT/JP2013/058453
§ 371 (c)(1),
(2) Date: Aug. 20, 2014

(87) PCT Pub. No.: WO2013/141390
PCT Pub. Date: Sep. 26, 2013

(65) Prior Publication Data
US 2015/0082175 A1 Mar. 19, 2015

(30) Foreign Application Priority Data
Mar. 22, 2012 (JP) ................... 2012-065840

(51) Int. Cl.
*G06F 3/048* (2013.01)
*G06F 3/16* (2006.01)
(Continued)

(52) U.S. Cl.
CPC ............ *G06F 3/167* (2013.01); *G06F 3/0482* (2013.01); *G10L 15/20* (2013.01); *G10L 2015/223* (2013.01); *H04M 2250/74* (2013.01)

(58) Field of Classification Search
CPC ....... G06F 3/167; G06F 3/0482; G10L 15/20; G10L 2015/223; H04M 2250/74; H04M 1/6083; H04M 1/6091
See application file for complete search history.

(56) References Cited

U.S. PATENT DOCUMENTS 6,185,535 B1    2/2001  Hedin et al.
9,162,574 B2 *  10/2015 Kolodziej .............. H04W 4/046
(Continued)

FOREIGN PATENT DOCUMENTS

EP    1746518 A1    1/2007
JP    9-062630 A    3/1997
(Continued)

OTHER PUBLICATIONS

International Search Report dated May 28, 2013 in PCT/JP2013/058453.
(Continued)

*Primary Examiner* — Andrew T Chiusano
(74) *Attorney, Agent, or Firm* — Wolf, Greenfield & Sacks, P.C.

(57) ABSTRACT

An apparatus includes a receiver, a shared information unit, a transmitter, a voice recognition unit, and an application execution unit. The receiver is configured to receive a voice signal and information from a second apparatus. The shared information unit is configured to create shared information (Continued)

shared by both the apparatus and the second apparatus based on the information received from the second apparatus. The transmitter is configured to transmit the shared information to the second apparatus. The voice recognition unit is configured to analyze the voice signal. The application execution unit is configured to execute an application based on a result generated by the voice recognition unit.

18 Claims, 9 Drawing Sheets

(51) Int. Cl.
*G06F 3/0482* (2013.01)
*G10L 15/20* (2006.01)
*G10L 15/22* (2006.01)

(56) References Cited

U.S. PATENT DOCUMENTS

| | | | |
|---|---|---|---|
| 10,282,316 | B2 | 5/2019 | Onohara et al. |
| 2002/0174270 | A1 | 11/2002 | Stecyk et al. |
| 2004/0024890 | A1 | 2/2004 | Baek et al. |
| 2007/0039025 | A1 | 2/2007 | Kraft et al. |
| 2007/0136446 | A1 | 6/2007 | Rezvani et al. |
| 2007/0213041 | A1 | 9/2007 | Horie |
| 2008/0062141 | A1* | 3/2008 | Chandhri ............... G06F 3/0482 345/173 |
| 2009/0075624 | A1 | 3/2009 | Cox et al. |
| 2009/0157198 | A1 | 6/2009 | Morikawa |
| 2011/0142252 | A1* | 6/2011 | Morito ................ G10L 21/0272 381/92 |
| 2011/0214162 | A1* | 9/2011 | Brakensiek ......... G06F 21/6218 726/4 |
| 2011/0254863 | A1 | 10/2011 | Hoshino |
| 2011/0265003 | A1 | 10/2011 | Schubert et al. |
| 2011/0275358 | A1 | 11/2011 | Faenger |
| 2012/0088548 | A1 | 4/2012 | Yun et al. |
| 2012/0159472 | A1* | 6/2012 | Hong .................. H04L 12/1813 717/178 |
| 2012/0183221 | A1* | 7/2012 | Alasry .................... G10L 15/06 382/181 |
| 2012/0245945 | A1* | 9/2012 | Miyauchi ................ G10L 15/06 704/275 |
| 2013/0197907 | A1* | 8/2013 | Burke .................... G10L 15/22 704/231 |
| 2014/0304431 | A1 | 10/2014 | Onohara et al. |
| 2018/0349298 | A1 | 12/2018 | Onohara et al. |
| 2019/0050197 | A1 | 2/2019 | Onohara et al. |

FOREIGN PATENT DOCUMENTS

| | | |
|---|---|---|
| JP | 2000-099233 A | 4/2000 |
| JP | 2002-007165 A | 1/2002 |
| JP | 2002-229940 A | 8/2002 |
| JP | 2002-237877 A | 8/2002 |
| JP | 2007-065944 A | 3/2007 |
| JP | 2009-146146 A | 7/2009 |
| JP | 2009-165192 A | 7/2009 |
| JP | 2009-205492 A | 9/2009 |
| JP | 2009-300537 A | 12/2009 |
| JP | 2010-130551 A | 6/2010 |
| JP | 2010-199718 A | 9/2010 |
| JP | 2010-263401 A | 11/2010 |
| JP | 2011-118822 A | 6/2011 |
| JP | 2011-254299 A | 12/2011 |
| WO | WO 00/23985 A1 | 4/2000 |

OTHER PUBLICATIONS

Written Opinion dated May 28, 2013 in connection with International Application No. PCT/JP2013/058453.
International Preliminary Report on Patentability dated Oct. 2, 2014 in connection with International Application No. PCT/JP2013/058453.
U.S. Appl. No. 14/357,881, filed May 13, 2014, Onohara et al.
U.S. Appl. No. 16/044,640, filed Jul. 25, 2018, Onohara et al.
U.S. Appl. No. 16/048,129, filed Jul. 27, 2018, Onohara et al.
Extended European Search Report dated Nov. 22, 2018 in connection with European Application No. 18184183.4.
International Search Report and Written Opinion and English translation thereof dated Feb. 5, 2013 in connection with International Application No. PCT/JP2012/079878.
International Preliminary Report on Patentability and English translation thereof dated Jul. 3, 2014 in connection with International Application No. PCT/JP2012/079878.
Japanese Office Action dated Sep. 11, 2018 in connection with Japanese Application No. 2017-216591 and English translation thereof.

* cited by examiner

FIG.2

| 1 | TUNER | |
| 2 | USB | |
| 3 | MUSIC | |
| 4 | INTERNET RADIO | |
| 5 | NAVI | |
| 6 | MAP | |
| 7 | MEDIA | |

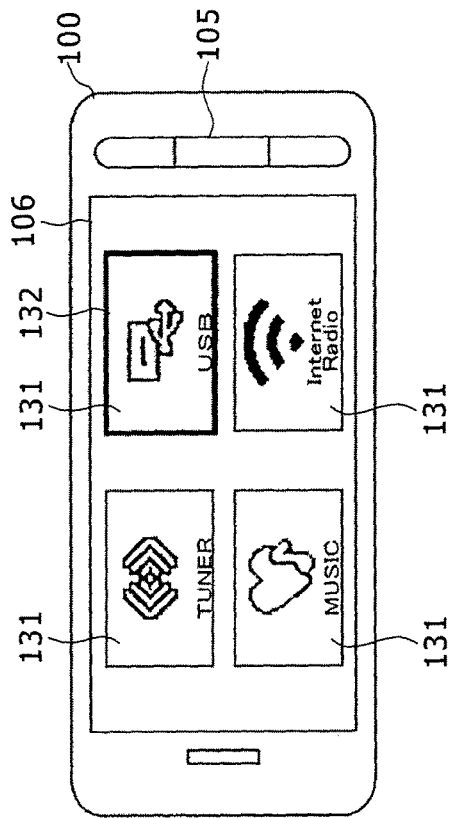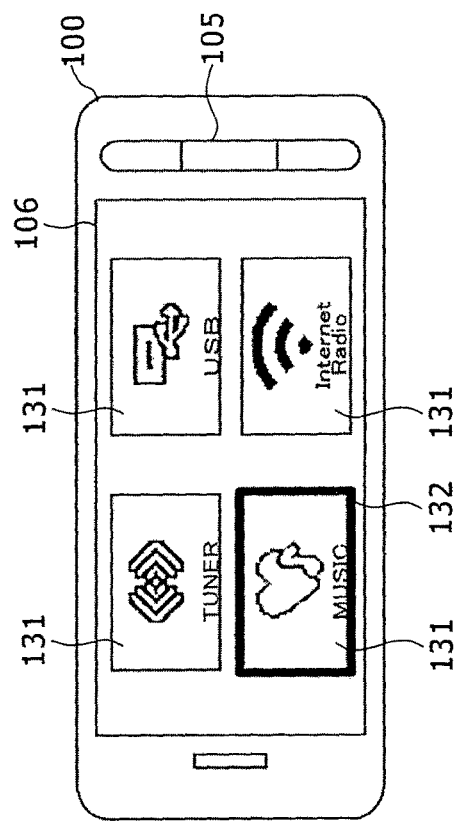
FIG. 3A
FIG. 3B

FIRST PAGE

FIRST PAGE　　SECOND PAGE

SECOND PAGE

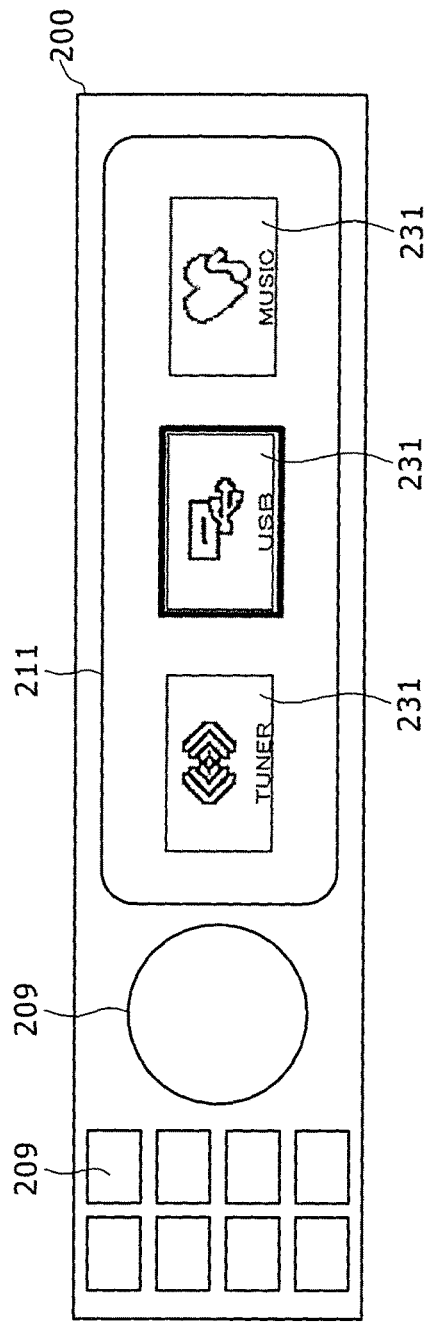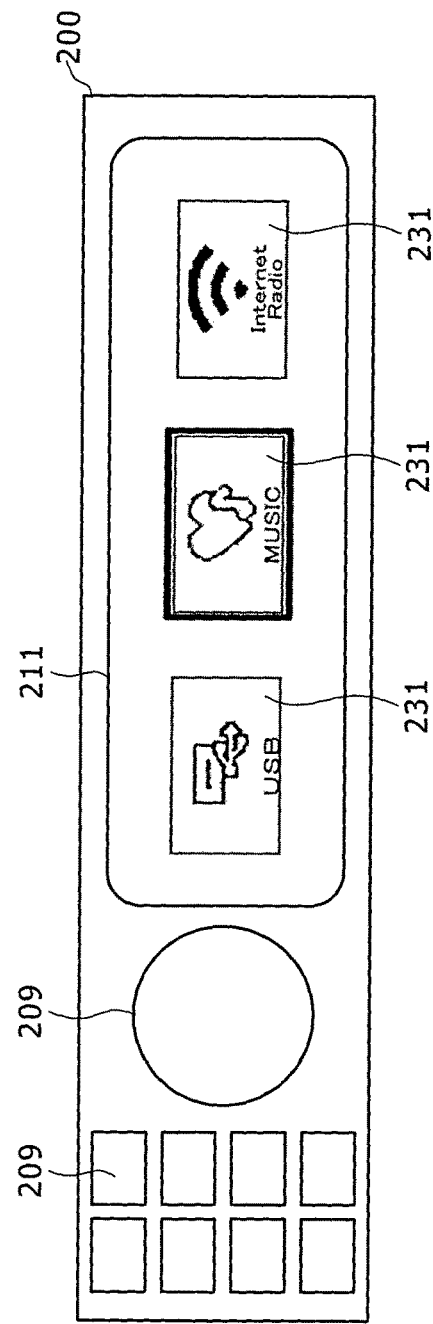

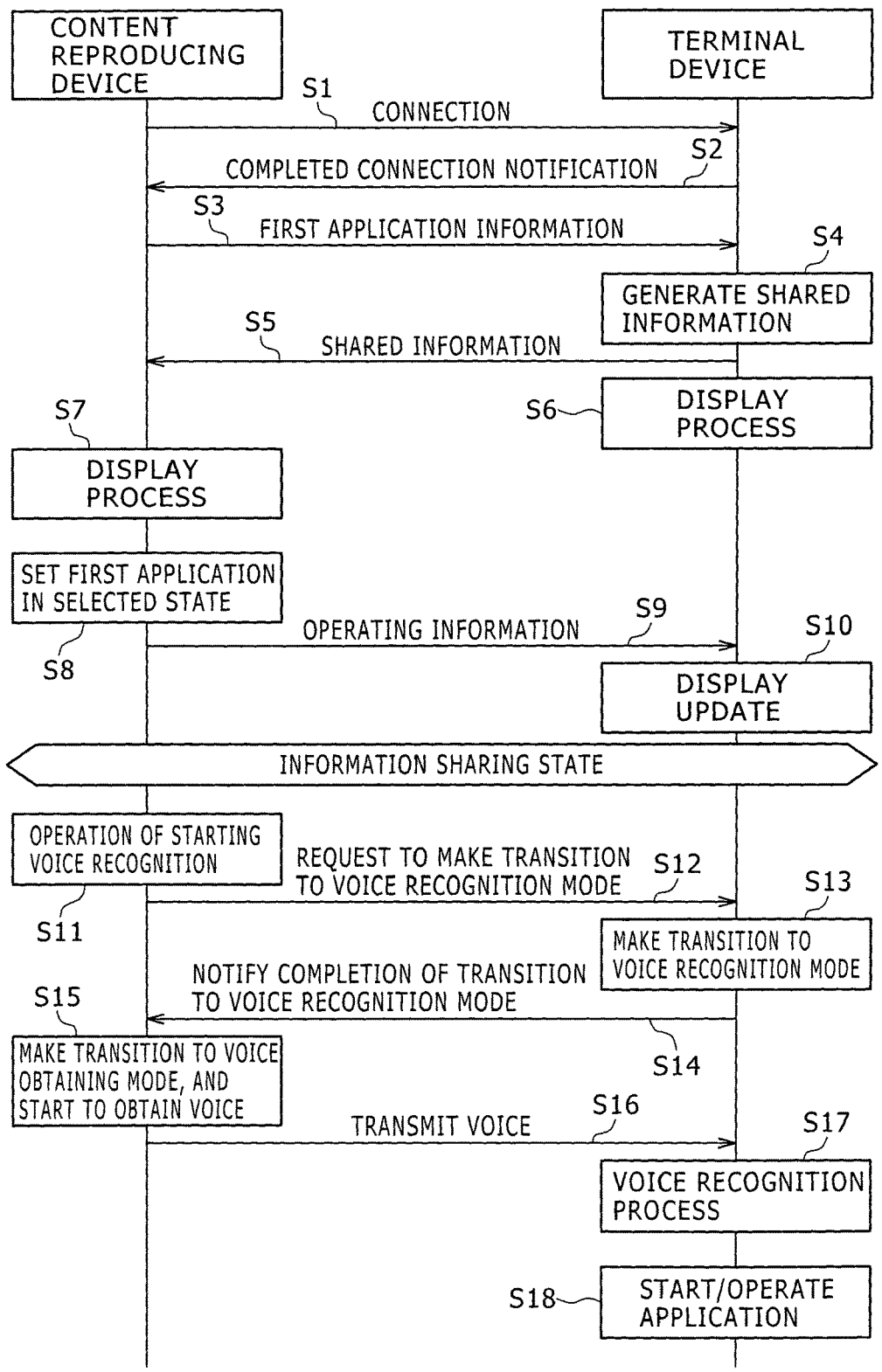

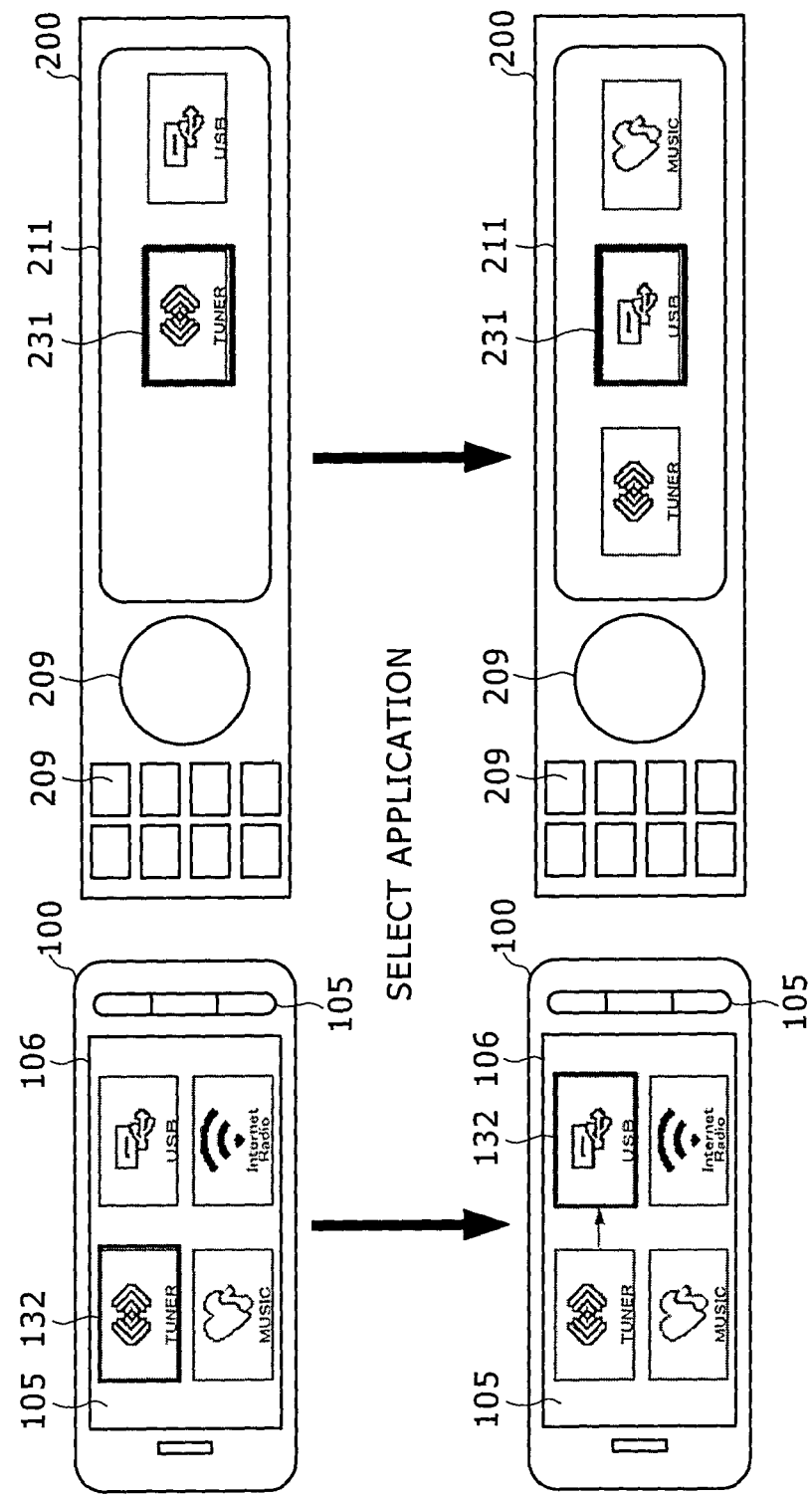

INFORMATION PROCESSING DEVICE, INFORMATION PROCESSING METHOD, AND TERMINAL DEVICE FOR GENERATING INFORMATION SHARED BETWEEN THE INFORMATION PROCESSING DEVICE AND THE TERMINAL DEVICE

RELATED APPLICATIONS

This Application is a national stage filing under 35 U.S.C. 371 of International Patent Application Serial No. PCT/JP2013/058453, filed Mar. 15, 2013, entitled "INFORMATION PROCESSING DEVICE, INFORMATION PROCESSING METHOD, INFORMATION PROCESSING PROGRAM, AND TERMINAL DEVICE". Foreign priority benefits are claimed under 35 U.S.C. § 119(a)-(d) or 35 U.S.C. § 365(b) of Japanese application number 2012-065840, filed Mar. 22, 2012. The entire contents of these applications are incorporated herein by reference in their entirety.

TECHNICAL FIELD

The present technology relates to an information processing device, an information processing method, an information processing program encoded on a non-transitory computer readable medium, and a terminal device.

BACKGROUND ART

Portable terminal devices such as portable telephones, smart phones, and the like having a wide variety of applications for providing various services and functions have recently spread. There is a desire for cooperation between these portable terminal devices and other devices to further improve the convenience of applications. Accordingly, an audio actuation system for actuating a vehicle-mounted device by voice by making a terminal device and the vehicle-mounted device cooperate with each other has been proposed (Patent Document 1).

PRIOR ART DOCUMENTS

Patent Documents

Patent Document 1: Japanese Patent Laid-Open No. 2009-300537

SUMMARY OF INVENTION

Technical Problem

The technology described in Patent Document 1 obtains voice by a microphone provided to the terminal device. However, it is not possible to operate a terminal device such as a portable telephone, a smart phone, or the like while driving in an automobile. Therefore terminal devices cannot necessarily be said to be suitable for obtaining voice.

The present technology has been made in view of such a point. It is an object of the present technology to provide an information processing device, an information processing method, an information processing program, and a terminal device for making the terminal device and another device cooperate with each other, and operating the terminal device by voice input to the device other than the terminal device.

Technical Solution

In one embodiment, the present invention includes apparatus including a receiver, a shared information unit, a transmitter, a voice recognition unit, and an application execution unit. The receiver is configured to receive a voice signal and information from a second apparatus. The shared information unit is configured to create shared information shared by both the apparatus and the second apparatus based on the information received from the second apparatus. The transmitter is configured to transmit the shared information to the second apparatus. The voice recognition unit is configured to analyze the voice signal. The application execution unit is configured to execute an application based on a result generated by the voice recognition unit.

In another embodiment, the present invention includes an apparatus including a voice input unit, a transmitter, and a receiver. The voice input unit is configured to detect a voice. The transmitter is configured to transmit a command to enter a voice recognition mode and a voice signal generated by the voice input unit to a second apparatus. The receiver is configured to receive shared information from the second apparatus.

Advantageous Effect

According to the present technology, the terminal device and the other device can be made to cooperate with each other, and the terminal device can be made to function by voice input to the device other than the terminal device. Thus, the terminal device can be made to function without the terminal device being operated.

BRIEF DESCRIPTION OF DRAWINGS

FIG. 2 is a diagram showing a concrete example of shared information.

FIG. 3 is a diagram showing an example of an external constitution of a terminal device.

FIG. 6 is a diagram showing an example of an external constitution of the content reproducing device.

FIG. 8 is a sequence diagram showing a flow of a process performed between the terminal device and the content reproducing device.

FIG. 9 is a diagram showing the interlocking of application selection display in the content reproducing device and the terminal device.

MODE FOR CARRYING OUT THE INVENTION

Embodiments of the present technology will hereinafter be described with reference to the drawings. However, the present technology is not limited to the following embodiments alone. Incidentally, description will be made in the following order.

<1. Embodiment>
[1-1. Configuration of Terminal Device]
[1-2. Configuration of Content Reproducing Device]
[1-3. Process between Terminal Device and Content Reproducing Device]
<2. Examples of Modification>

1. First Embodiment 1-1. Configuration of Terminal Device

Figure 1:
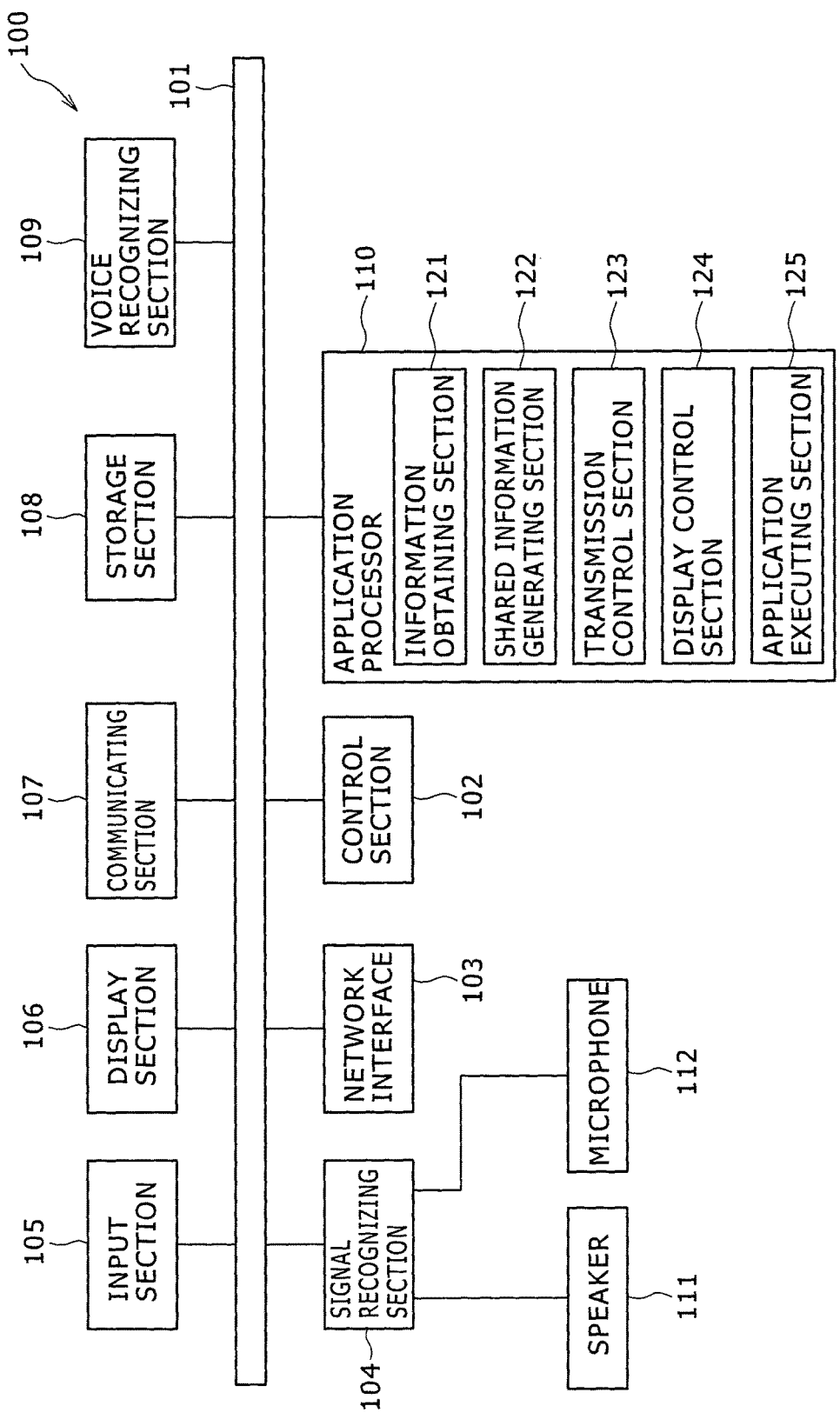
FIG. 1 is a block diagram showing a configuration of a terminal device as an example of a second device according to the present technology.

FIG. 1 is a block diagram showing a configuration of a terminal device 100 in a present embodiment. The terminal device 100 is an example of a second device in claims. The terminal device 100 includes a data bus 101. This data bus 101 is connected with a control section 102, a network interface 103, a signal processing section 104, an input section 105, a display section 106, a communicating section 107, a storage section 108, and an application processor 110.

The control section 102 is for example composed of a CPU (Central Processing Unit), a RAM (Random Access Memory), a ROM (Read Only Memory), and the like. The ROM stores a program read and run by the CPU, and the like. The RAM is used as a work memory for the CPU. The CPU controls each part and the whole of the terminal device 100 by performing various processes according to the program stored in the ROM.

The network interface 103 for example transmits and receives data to and from an external base station or the like on the basis of a predetermined protocol. A communication system may be any system such as that of communication using a wireless LAN (Local Area Network), Wi-Fi (Wireless Fidelity), or a 3G line, or the like. The communication of the network interface 103 enables the terminal device 100 to make Internet connection; a call to another person, and the like.

The signal processing section 104 includes a modulator-demodulator, an AD/DA converter, an audio codec (not shown), and the like. The modulator-demodulator of the signal processing section 104 modulates an audio signal to be transmitted, or demodulates a received signal. The signal to be transmitted is converted into a digital signal by the AD/DA converter. The received signal is converted into an analog signal by the AD/DA converter. The signal processing section 104 is connected with a speaker 111 for outputting audio and a microphone 112 for inputting audio.

The input section 105 is input means for a user to perform various kinds of input to the terminal device 100. The input section 105 is for example composed of a button, a touch panel, a switch, and the like. In addition, the input section 105 may be configured as a touch screen formed integrally with the display section 106. When the user performs an input operation on the input section 105, a control signal corresponding to the input is generated and output to the control section 102. Then, the control section 102 performs arithmetic processing and control corresponding to the control signal.

The display section 106 is for example display means formed by an LCD (Liquid Crystal Display), a PDP (Plasma Display Panel), an organic EL (Electro Luminescence) panel, or the like. The display section 106 displays a home screen for displaying a menu of various kinds of operations on the terminal device 100, a musical piece list, information on a musical piece being reproduced (the name of an artist, the name of the song, and the like), moving image content, image content, or the like.

The communicating section 107 is a communication module for communication with the terminal device 100 by a method of communication. Methods of communication in the communicating section 107 include a wireless communication such as BLUETOOTH®, a wire communication such as USB communication, and the like. A BLUETOOTH module for performing wireless communication is a module capable of transmitting and receiving data by the short range wireless communication of the BLUETOOTH system. The BLUETOOTH module exchanges data with a content reproducing device as an external BLUETOOTH device.

The BLUETOOTH module includes an antenna, a signal processing section (not shown), and the like. When audio data is transmitted to the content reproducing device 200 as an external BLUETOOTH device, for example, the BLUETOOTH module subjects the audio data to be transmitted to predetermined signal processing by the signal processing section, and transmits the audio data to the content reproducing device 200 via the built-in antenna. In addition, when audio data is transmitted to the content reproducing device 200, the BLUETOOTH module receives the audio data transmitted from the content reproducing device by the built-in antenna, and supplies the audio data to the built-in signal processing section 104. Then, the signal processing section subjects the audio data to predetermined signal processing, and thereby generates an audio signal. It is thereby possible to output the audio data reproduced by the terminal device 100 from the content reproducing device 200, and output the audio data reproduced by the content reproducing device 200 from the terminal device 100.

When USB as wire communication is used as a communication system in the communicating section 107, the content reproducing device 200 and the terminal device 100 are connected to each other by a USB cable. Audio data is supplied from the terminal device 100 to the content reproducing device 200 via the USB cable.

Hence, in the present embodiment, it is also possible to connect the terminal device 100 and the content reproducing device 200 to each other, reproduce musical piece data stored by the terminal device 100, and output the musical piece as audio from the content reproducing device 200.

However, the connection method may be any method. In addition, any connection method capable of arbitrary data communication other than BLUETOOTH and USB may be adopted. In addition, it is preferable that the communication system be selected appropriately on the basis of the type of the terminal device 100, the type of an OS (Operating System), and the like.

The storage section 108 is for example formed by a mass storage medium such as an HDD, a flash memory, or the like, and stores content data of musical pieces and the like to be reproduced by the terminal device 100. The musical piece data is stored in the storage section 108 in a state of being audio-compressed by a system such as WAV (RIFF waveform Audio Format), MP3 (MPEG Audio Layer-3), AAC (Advanced Audio Coding), or the like. Musical piece information including the names of artists of musical pieces, the names of albums, the names of songs, total reproduction times, reproduction time information, and the like is also stored in the storage section 108 as metadata of the musical piece data. The musical piece information can be obtained by using a CDDB (Compact Disc Data Base), for example. In addition, the user may be allowed to set musical piece information arbitrarily.

A voice recognizing section 109 is for example composed of a CPU, a ROM, a RAM, and the like, and performs language recognition on the basis of audio data supplied from the communicating section 107 to recognize language included in the audio signal in word units and extract a keyword. Incidentally, various methods for voice recognition are proposed. Therefore the voice recognizing section 109 preferably performs voice recognition processing using one of the methods.

The methods for voice recognition include for example a method of accumulating the characteristics of voice from learning data and comparing the characteristics with supplied audio to extract a keyword, a method using a hidden Markov model (HMM), and the like. The voice recognizing section 109 supplies the extracted keyword as data in a predetermined format such for example as text data to the application processor 110.

The application processor 110 is for example a processing section that is composed of a CPU, a ROM, a RAM, and the like and which executes various kinds of applications installed on the terminal device 100. The applications include various types such for example as applications for music reproduction, moving image reproduction, maps, the weather, navigation, games, Internet browsers, use of moving image sharing sites, a calculator, and the like.

The present technology is implemented by the execution by the application processor 110 of an information processing application installed on the terminal device 100. The application processor 110 functions as an information obtaining section 121, a shared information generating section 122, a transmission control section 123, a display control section 124, and an application executing section 125 by executing the information processing application. Functions implemented by the execution of the information processing application correspond to an information processing device in claims.

The information obtaining section 121 obtains information (first application information) indicating applications for outputting content from content sources possessed by the content reproducing device 200 (which applications correspond to an application possessed by a first device in claims) from the content reproducing device 200 via the communicating section 107. The content sources include Internet radio, an external storage connected by a USB or the like, a disk medium module for reproducing a disk medium, and the like.

The information obtaining section 121 also obtains information (second application information) indicating applications selected by the user to be shared in the content reproducing device 200 and the terminal device 100 from applications possessed by the terminal device 100.

The information obtaining section 121 further receives information (operating information) indicating the description of an operation of selecting an application which operation is performed on the content reproducing device 200 via the communicating section 107. Details of the operating information will be described later.

The shared information generating section 122 generates shared information by making the first application information and the second application information obtained by the information obtaining section 121 coexist with each other. The shared information is used in the terminal device 100, and transmitted to the content reproducing device 200 via the communicating section 107 under control of the communication control section 102. The shared information is thus shared between the content reproducing device 200 and the terminal device 100.

Figure 2:
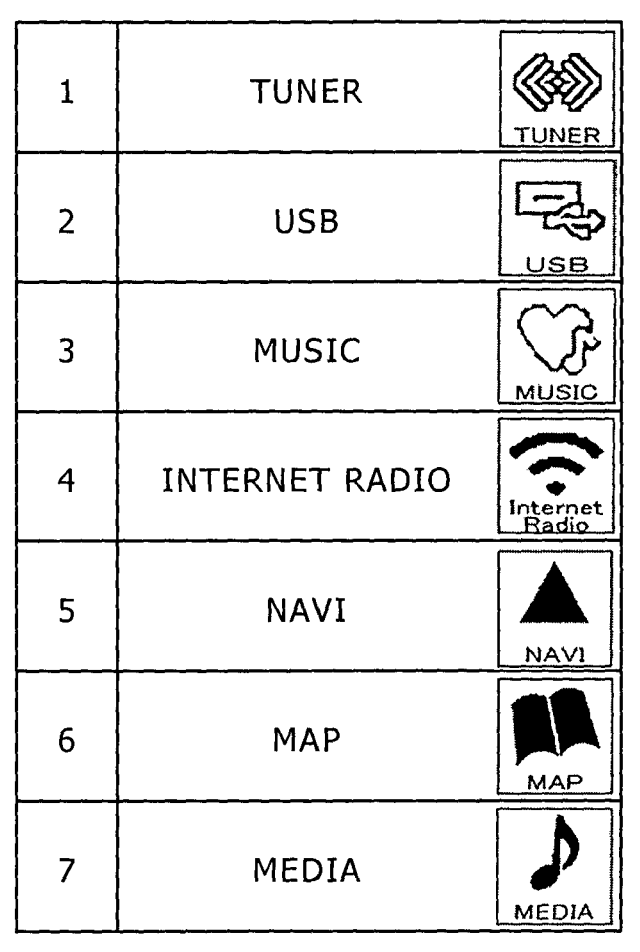

As shown in FIG. 2, for example, the shared information is information in a list format in which the applications indicated by the first application information and the second application information are ordered. This order corresponds to order of display of icons representing the applications of the terminal device 100 and the content reproducing device on the display section 106.

Incidentally, in the present technology, when communication is performed using BLUETOOTH, the first application information, the shared information, the operating information, and the like are transmitted and received between the terminal device 100 and the content reproducing device 200 using a serial port profile. In addition, when USB is used for connection between the content reproducing device 200 and the terminal device 100, the first application information, the shared information, the operating information, and the like are transmitted and received using iAP.

The serial port profile and iAP allow transmission and reception of arbitrary information. Thus, these can be used to transmit and receive the above-described various kinds of information used in the present technology. However, another method may be used as long as the method allows transmission and reception of the above-described various kinds of information. In addition, any connecting method other than BLUETOOTH and USB may be adopted as long as the connecting method allows arbitrary data communication.

The display control section 124 performs control on the basis of the shared information to display the icons representing the applications for the content sources of the content reproducing device 200 (applications for reproducing content within the content sources) and the applications of the terminal device 100 which applications are selected by the user. The display control section 124 also performs display control corresponding to an application started/operated by the application executing section 125 on the basis of a keyword supplied from the voice recognizing section 109.

The application executing section 125 starts an application installed on the terminal device 100 and further operates the application on the basis of keywords supplied from the voice recognizing section 109. As a method for starting and operating an application on the basis of keywords, for example, the starting and operation of applications and keywords corresponding to the starting and operation of the applications are retained as a table in advance. Then, when a keyword is supplied from the voice recognizing section 109, the application processor 110 refers to the table to search for an application or an operation corresponding to the keyword. When there is an application or an operation corresponding to the keyword, the starting of the application or the operation is performed.

For example, when an input keyword is the name of an application, the application is started. When the name of a place is input as a keyword in a state of a navigation application having been started, a route to the place of the name is retrieved, and navigation is started. In addition, when a keyword is input in a state of an application for the use of a moving image sharing site having been started, the application is made to search for a moving image using the keyword, present a result of the search, reproduce the moving image, stop the moving image, or perform fast forwarding or fast rewinding, for example. The application executing section 125 performs such processing on the basis of an input keyword.

Incidentally, any method other than the method described above may be adopted as long as the method enables the starting or operation of an application which starting or operation corresponds to a supplied keyword on the basis of the keyword.

Incidentally, the information processing application may be provided to the user in a state of being installed on the terminal device 100 in advance, or may be installed onto the terminal device 100 by the user himself/herself. The information processing application is for example provided or sold via an application selling site or an application download service on the Internet. In addition, the information processing application may be provided or sold via a portable recording medium such as an optical disk, a semiconductor memory, or the like on which medium the information processing application is recorded.

The speaker 111 is audio output means for outputting audio, and outputs an audio signal resulting from predetermined processing by the signal processing section 104 or the like as audio. The user can thereby listen to a call voice, audio data stored in the terminal device 100, or the like. In addition, the microphone 112 is to input audio to the terminal device 100 for a call, an instruction input by voice, or the like. The audio input from the microphone 112 is subjected to predetermined processing by the signal processing section 104.

The terminal device 100 is configured as described above. The terminal device 100 is a portable telephone, a smart phone, a portable music player, a tablet terminal, or the like. In addition, though not shown, a camera function composed of an imaging section, an image processing section, and the like, a radio function, and the like may be provided to the terminal device 100.

FIG. 3 is a diagram showing an example of an external constitution of the terminal device 100. FIG. 3 shows a touch screen as the display section 106 and the input section 105 of the terminal device 100 and buttons as the input section 105.

The display section 106 of the terminal device 100 displays a plurality of icons 131, 131, . . . representing the applications indicated by the shared information. In the present embodiment, icons representing the content sources of the content reproducing device and the applications selected by the user on the terminal device 100 are displayed.

The user selects an application by bringing a finger into contact with an icon 131 displayed on the display section 106 or pressing a button as the input section 105. When the application is selected, a cursor 132 in the form of a thick frame indicating the selected application moves from a state of FIG. 3A to a state of FIG. 3B, for example. When an application determining input is thereafter performed by performing input to the icon 131 of the selected application again, for example, the selected application is started.

Figure 4A:
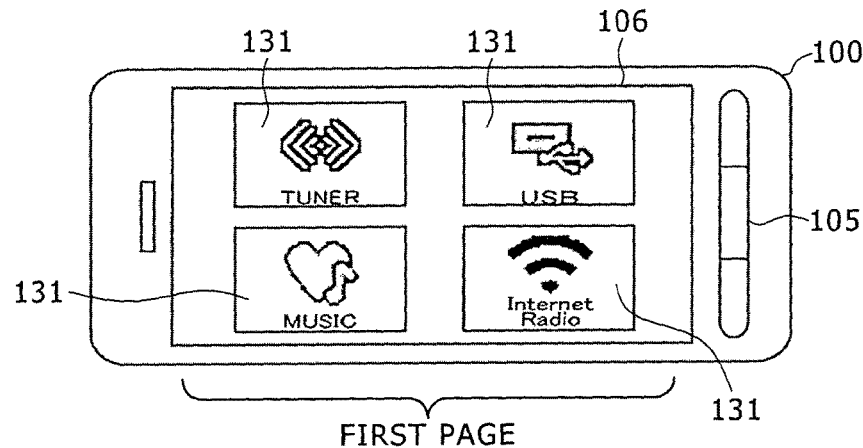
FIG. 4 is a diagram of assistance in explaining page scrolling operation in a display section of the terminal device.
Figure 4B:
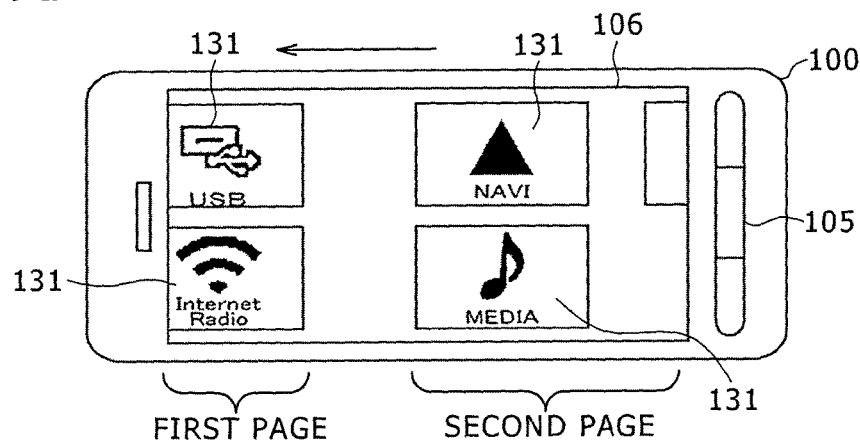
Figure 4C:
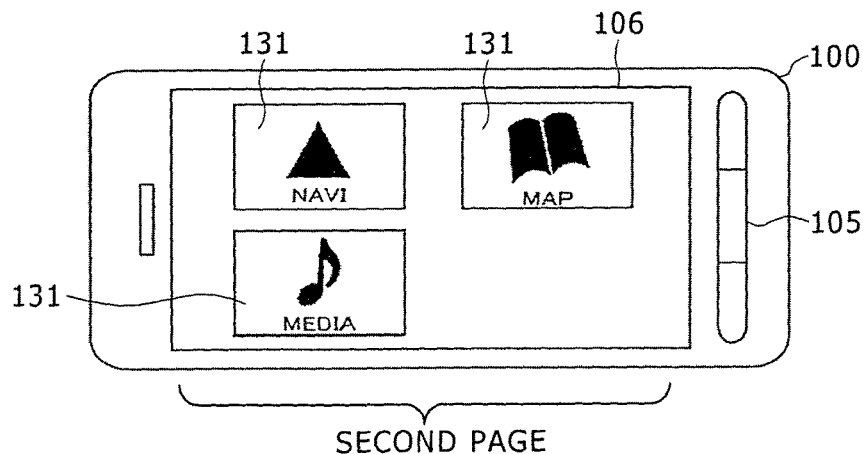

Description will be made in the following of page scrolling operation in the terminal device 100. FIG. 4A shows a first page displaying a plurality of icons 131 representing applications on the display section 106 of the terminal device 100. In the state of FIG. 4A in which the first page is displayed, the screen is slid in a horizontal direction by input to the touch screen or the like. Then, as shown in FIG. 4B, a transition state occurs in which the first page flows and disappears in a slide direction, and at the same time, a second page slides and appears from an edge of the display section 106. When the slide operation of the second page is completed after the transition state, the whole of the second page is displayed on the display section 106, as shown in FIG. 4C. Icons 131 displayed on the second page are different from those displayed on the first page. This series of display transitions on the display section 106 will be referred to as "page scrolling," and input operation for performing the page scrolling will be referred to as "page scrolling operation."

Incidentally, the description of FIG. 4 has been made by taking a transition from the first page to the second page as an example. However, page scrolling can be similarly performed from the second page to a third page, from the third page to a fourth page, or from the second page to the first page, for example. The number of pages differs according to the number of applications installed on the terminal device 100. When there are a large number of applications, the number of pages is correspondingly increased.

A portable telephone, a smart phone, a tablet terminal, or the like generally displays the icons of applications in an arrangement of five rows×four columns, four rows×four columns, or the like. However, the display control section 124 may perform display control such that larger icons are displayed in two rows×two columns, for example, as shown in FIG. 4. This facilitates input operation on the terminal device 100.

Incidentally, the external constitution of the terminal device 100, the mode of display on the display section 106, and the arrangement of the buttons as the input section 105 shown in FIG. 4 are a mere example, and are not limited to FIG. 4.

1-2. Configuration of Content Reproducing Device

Figure 5:
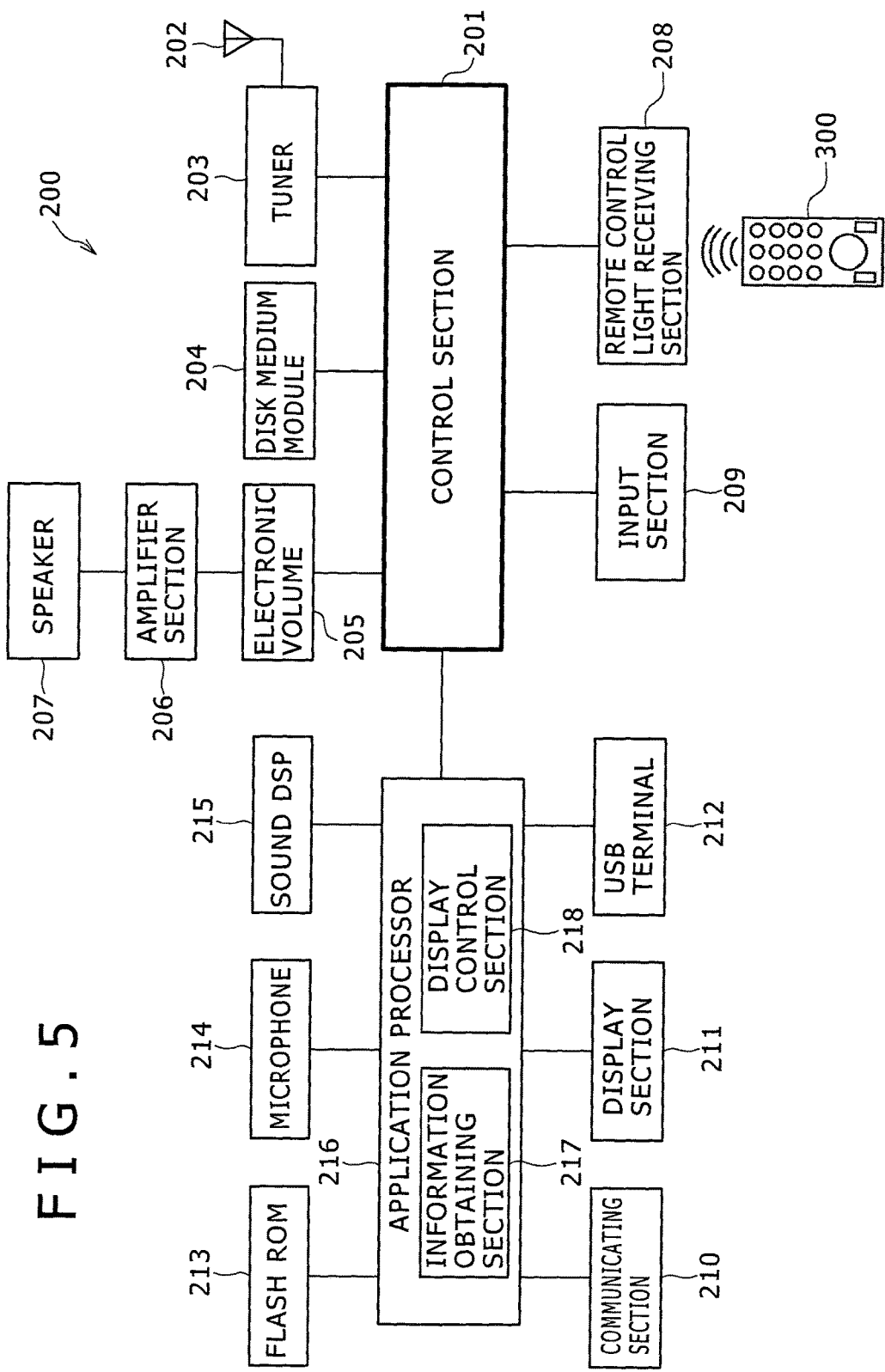
FIG. 5 is a block diagram showing a configuration of a content reproducing device as an example of a first device according to the present technology.

FIG. 5 is a block diagram showing a configuration of the content reproducing device 200 in the embodiment of the present technology. The content reproducing device 200 is an example of a first device in claims. The content reproducing device 200 is a so-called stationary device. Stationary devices include for example a car audio device for reproducing content in a vehicle, a dock speaker used mainly in a house, and the like.

The content reproducing device 200 includes a control section 201, a radio antenna 202, a tuner 203, a disk medium module 204, an electronic volume 205, an amplifier section 206, a speaker 207, a remote control light receiving section 208, an input section 209, a communicating section 210, a display section 211, a USB terminal 212, a flash ROM 213, a microphone 214, a sound DSP (Digital Signal Processing) 215, and an application processor 216.

The control section 201 is for example composed of a CPU, a RAM, a ROM, and the like. The ROM stores a program read and run by the CPU, and the like. The RAM is used as a work memory for the CPU. The CPU controls each part and the whole of the content reproducing device 200 by performing various processes according to the program stored in the ROM.

The radio antenna 202 is an antenna for receiving radio airwaves, and is connected to the tuner 203. The tuner 203 reconstructs radio audio data by performing processes of demodulation of a radio broadcast signal received by the radio antenna 202, analog/digital conversion, the decoding of coded data, and the like. The radio audio data is sent to the speaker 207 via the electronic volume 205 and the amplifier section 206 under control of the control section 201, and output as audio by the speaker 207.

The disk medium module 204 is a disk reproducing device for reading an audio signal written on a disk-shaped recording medium, subjecting the read audio signal to predetermined signal processing, and thereby obtaining a sound signal. The obtained sound signal is sent to the speaker 207 via the electronic volume 205 and the amplifier section 206 under control of the control section 201, and output as audio by the speaker 207. Incidentally, disk-shaped recording media include a CD (Compact Disc), a DVD (Digital Versatile Disc), a BD (BLU-RAY Disc®), and the like.

The electronic volume 205 amplifies an audio signal supplied from the tuner 203, the disk medium module 204, the communicating section 210, the USB terminal 212, or the like and adjusts sound volume under control of the control section 201. The audio signal whose sound volume is adjusted is supplied to the amplifier section 206. The amplifier section 206 amplifies the audio signal supplied from the electronic volume 205 in a predetermined manner, and supplies the audio signal to the speaker 207. The speaker 207 is audio output means for outputting the audio signal supplied from the amplifier section 206 as audio to the outside.

The remote control light receiving section 208 receives a control signal transmitted from a remote controller 300 included with the content reproducing device 200 by an operation of the user, and outputs the control signal to the control section 201.

The input section 209 is input means for the user to perform various kinds of input operations to the content reproducing device 200. The input section 209 for example includes a button, a touch panel, a switch, and the like. In addition, the input section 209 may be configured as a touch screen formed integrally with the display section 211. When the user performs an input on the input section 209, a control signal corresponding to the input is generated and output to the control section 201. Then, the control section 201 performs arithmetic processing and control corresponding to the control signal.

In the present embodiment, the user can perform an application selecting operation, a determining operation for starting the selected application, and the like on the input section 209.

The display section 211 is for example display means formed by an LCD, a PDP, an organic EL panel, or the like. The display section 211 displays a home screen for displaying a menu of various kinds of operations on the content reproducing device 200, a musical piece list, information on a musical piece being reproduced (the name of an artist, the name of the song, and the like), and the like. Further, when the content reproducing device 200 is ready for moving image content, image content, and the like, these content are also displayed.

Further, when a touch screen is formed by the input section 209 and the display section 211, the display section 211 displays a user interface image of software buttons as the input section 209 or an individual operating screen for sound volume adjustment, content selection, or the like.

The communicating section 210 communicates with the terminal device 100. The communicating section 210 has a similar configuration to that of the terminal device. Audio data from the terminal device which audio data is received by the communicating section 210 is supplied to the sound DSP 215.

In addition, when BLUETOOTH is used as a communication system, the first application information, the shared information, the operating information, and the like are transmitted and received between the terminal device 100 and the content reproducing device 200 using a serial port profile. In addition, when USB is used for connection between the content reproducing device 200 and the terminal device 100, arbitrary information such as the first application information, the shared information, the operating information, and the like can be transmitted and received using iAP.

However, the connecting method may be any method. In addition, any connecting method other than BLUETOOTH and USB may be adopted as long as the connecting method allows arbitrary data communication.

The USB terminal 212 is a connecting terminal compliant with USB standards for connecting an external device, an external recording medium, and the like to the content reproducing device 200. The USB terminal 212 is for example connected with an external storage such as an external HDD (Hard Disc Drive), a USB memory, and the like for storing audio data. Audio data stored in the external storage is sent to the speaker 207 via the electronic volume 205 and the amplifier section 206 under control of the control section 201, and output as audio by the speaker 207.

The flash ROM 213 is a nonvolatile memory, and stores various kinds of data such as device information as information on BLUETOOTH devices, radio broadcasting frequency information, and the like. The stored device information or the stored frequency information is read and supplied to the control section 201 in response to a request from the control section 201.

The microphone 214 obtains sound uttered by the user. The voice input to the microphone 214 is converted into an audio signal, which is supplied to the application processor 216. The application processor 216 supplies the audio signal to the sound DSP 215.

The sound DSP 215 subjects audio data supplied from a BLUETOOTH module as the communicating section 210 or the like to predetermined audio signal processing, and supplies the audio data to the electronic volume 205. The audio signal is finally output as audio from the speaker 207 via the electronic volume 205 and the amplifier section 206.

In addition, the sound DSP 215 subjects the audio signal from the microphone 214 to noise canceling processing. Various noise canceling methods are proposed. Thus, the noise canceling processing is preferably performed by using an arbitrary method. Noise canceling methods include for example a method of reducing noise other than the voice of the user by generating an acoustic wave component of an opposite phase from noise or ambient sound obtained by the microphone 214 and making the acoustic wave component and the noise or ambient sound cancel each other out.

The application processor 216 is for performing predetermined processing on the side of the content reproducing device 200 so as to correspond to the operation of the information processing application in the terminal device. The application processor 216 functions as an information obtaining section 217 and a display control section 218 by executing a predetermined application.

The information obtaining section 217 obtains the shared information transmitted from the terminal device 100 via the communicating section 210. In addition, the information obtaining section 217 obtains information (operating information) indicating an application selecting operation performed by the user on the terminal device 100 via the communicating section 210.

The display control section 218 controls display on the display section 211 on the basis of the shared information obtained by the information obtaining section 217. The display control section 218 also controls display of a cursor showing the selection of an application, and the like. Further, a process of updating display on the display section 211 on the basis of the operating information is performed. Details of these display controls will be described later.

In the present embodiment, the content reproducing device 200 has three content sources, which are the tuner, the USB-connected external storage storing audio data, and the disk medium module. However, the number and kinds of content sources are not limited to the three content sources. One content source may be provided, or a larger number of content sources may be provided.

FIG. 6 is a diagram showing an example of an external constitution of a front panel of the content reproducing device 200. FIG. 6 shows the input section 209 and the display section 211 provided to the front panel of the content reproducing device 200.

The display section 211 of the content reproducing device 200 displays a plurality of icons 231, 231, representing the applications indicated by the shared information. In the present embodiment, icons representing the content sources of the content reproducing device 200 and the applications selected by the user on the terminal device 100 are displayed.

In the example shown in FIG. 6, the applications selected by the user are displayed in substantially the center of the display section 211. In FIG. 6, USB is selected. When the user selects a different application, the icons move horizontally from a state shown in FIG. 6A to a state shown in FIG. 6B. FIG. 6B shows the MUSIC icon selected next in substantially the center of the display section 211. Incidentally, "USB" is an icon representing an application for reproducing audio data stored in the external storage connected to the USB terminal 212. In addition, "MUSIC" is an icon representing an application for reproducing audio data of the disk medium module.

Incidentally, the external constitution of the content reproducing device 200 and the mode of display on the display section 211 shown in FIG. 6 are a mere example, and are not limited to FIG. 6. For example, as in display on the terminal device, the content reproducing device 200 may arrange and display the icons in a plurality of rows rather than in one row.

1-3. Process Between Terminal Device and Content Reproducing Device

Description will next be made of a process between the terminal device 100 and the content reproducing device 200 described above.

In the present technology, the display section 211 of the content reproducing device 200 as a first device and the display section 106 of the terminal device 100 as a second device display the icons representing shared applications. In addition, when an operation of selecting an application is performed on one of the devices, an operation of selecting the same application is performed in the other device in such a manner as to be interlocked with the operation of selecting the application on the one device.

Thus, for example, an application in the terminal device 100 can be selected by input to the content reproducing device 200. When an application determining operation is performed on the one device after the selection of the application, the other device including the application determines the application and starts the application. Thus, an application in the other device can be selected and started by operation on the one device.

In addition, when voice input to the microphone 214 of the content reproducing device 200 is performed, the voice is transmitted to the terminal device 100, and the terminal device 100 performs voice recognition and the starting/operation of an application on the basis of a keyword extracted by the voice recognition. Thus, the user can use the application in the terminal device 100 without touching the terminal device 100.

Figure 7:
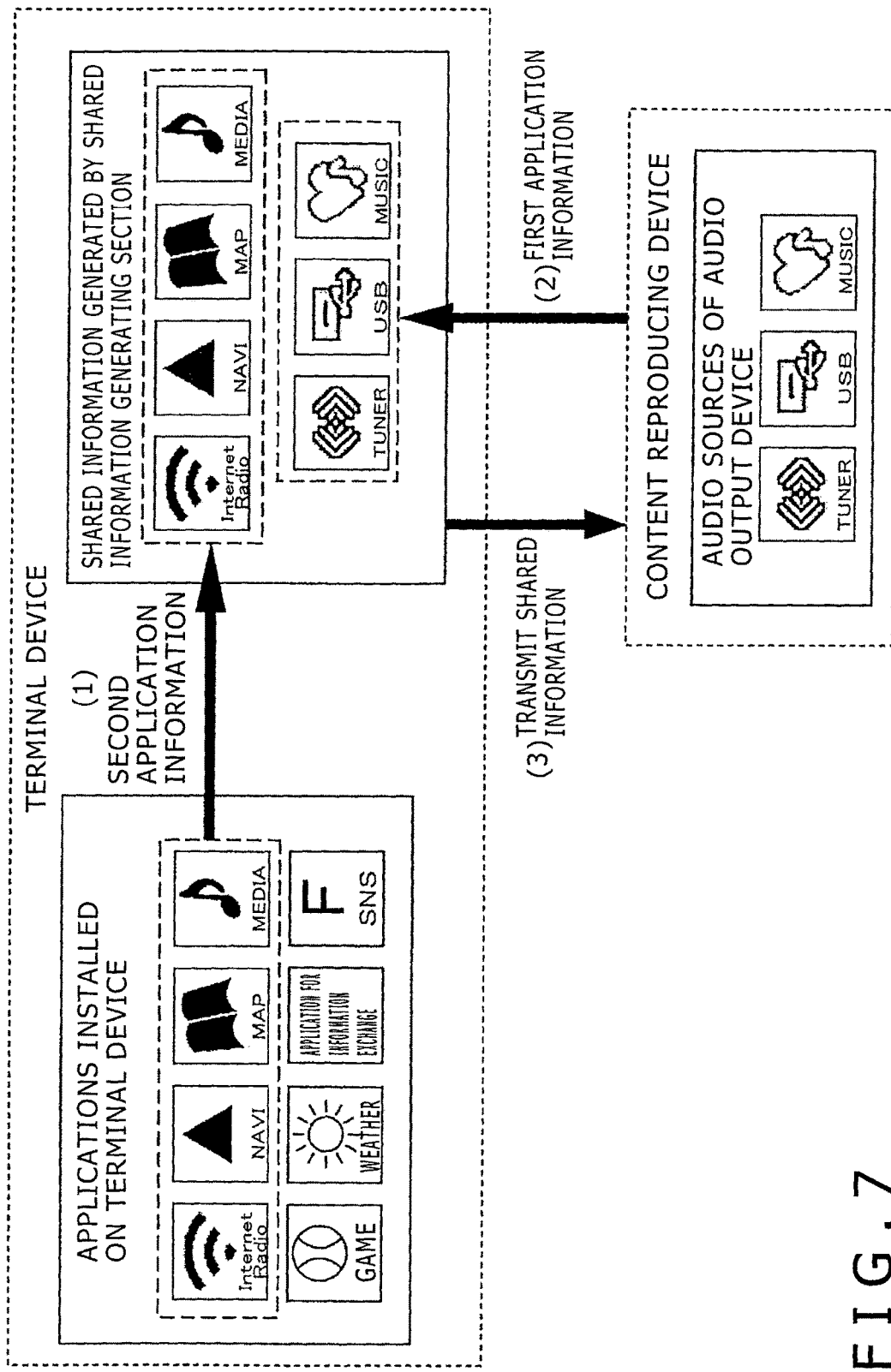
FIG. 7 is a conceptual diagram of assistance in explaining the sending and receiving of information between the terminal device and the content reproducing device.

FIG. 7 is a conceptual diagram of assistance in explaining the sending and receiving of information between the content reproducing device 200 and the terminal device 100. FIG. 8 is a sequence diagram showing a process between the content reproducing device 200 and the terminal device 100. FIG. 9 is a diagram showing states in which the selection of applications is synchronized in the content reproducing device 200 and the terminal device 100.

First, as a precondition for the process, as shown in FIG. 7, suppose that for example a plurality of applications for a game, the weather, a map, and the like are installed on the terminal device 100. In addition, suppose that the information processing application as described above is also installed.

Then, as indicated by (1) in FIG. 7, suppose that the user has selected applications to be shared with the content reproducing device 200 from the applications installed on the terminal device 100 in advance, and that the information obtaining section 121 has obtained information (second application information) on the selected applications in advance.

In addition, the content reproducing device 200 has one or a plurality of content sources. As shown in FIG. 5 and FIG. 7, the content reproducing device 200 in the present embodiment has three content sources, which are the radio tuner, the USE-connected external storage storing audio data, and the disk medium module. However, the number and kinds of content sources are not limited to the three content sources.

First, in step S1, the content reproducing device 200 and the terminal device 100 are connected to each other. The connection is made by a method of BLUETOOTH, USB connection, or the like in the communicating sections of both devices, as described above. When the connection is made by BLUETOOTH, information is transmitted and received between the content reproducing device 200 and the terminal device 100 using a serial port profile. When the connection is made by USB, information is transmitted and received between the content reproducing device 200 and the terminal device 100 using iAP.

When the connection between the content reproducing device 200 and the terminal device 100 is established, a completed connection notification is transmitted from the terminal device 100 to the content reproducing device 200 in next step S2. Incidentally, as the reverse of the process shown in FIG. 8, the connection may be made from the terminal device 100 to the content reproducing device 200, and the completed connection notification may be made from the content reproducing device 200 to the terminal device 100.

In next step S3, as indicated by (2) in FIG. 7, information (first application information) indicating kinds of applications for reproduction of the content sources of the content reproducing device 200 is transmitted from the content reproducing device 200 to the terminal device 100. In FIG. 7, information indicating that the content reproducing device 200 has the three content sources of the tuner, the USB-connected external storage, and the disk medium module is transmitted to the content reproducing device 200.

In next step S4, the shared information generating section 122 of the terminal device 100 generates shared information by collecting together the second application information selected by the user and the first application information and making the application information of both devices coexist with each other. As described with reference to FIG. 4, the shared information is in a list format in which the types of the applications are ordered. The shared information includes both of the applications of the content reproducing device 200 and the applications of the terminal device 100.

In next step S5, as indicated by (3) in FIG. 4, the shared information is transmitted from the terminal device 100 to the content reproducing device 200 under control of the transmission control section 123 of the terminal device 100. By this shared information, the content reproducing device 200 and the terminal device 100 share information on the applications of the content reproducing device 200 and the terminal device 100 with each other. Then, in step S6, the display control section 124 of the terminal device 100 performs a display process based on the shared information. Thereby, as shown in an upper row of FIG. 9A, icons representing the content sources in the content reproducing device 200 and the applications selected by the user on the terminal device 100 are displayed on the display section 106 of the terminal device 100.

In addition, in step S7, the display control section 218 of the content reproducing device 200 similarly performs a display process based on the shared information. Thereby, as shown in an upper row of FIG. 9B, the icons representing the content sources in the content reproducing device 200 and the applications selected by the user on the terminal device 100 are displayed on the display section 211 of the content reproducing device 200.

Incidentally, while display control in the content reproducing device 200 is performed after display control in the terminal device 100 in the sequence diagram of FIG. 8, the order is not limited to this, but the display control in both devices is desirably performed substantially simultaneously.

In next step S8, the content reproducing device 200 sets a first application among the applications indicated by the shared information in a selected state. The selected state means that, for example, when an application is selected by moving a cursor, the cursor is positioned at the first application. Then, in step S9, the information obtaining section 121 on the side of the terminal device 100 obtains operating information of the content reproducing device 200. Incidentally, the operating information obtained in step S9 is information indicating that the application positioned as first application among the applications indicated by the shared information is selected.

In next step S10, the display control section 124 of the terminal device 100 updates the display on the display section 106 of the terminal device 100 on the basis of the operating information. Incidentally, in this case, the display control section 124 performs display control so as to make display indicating that the application positioned as first application in the shared information is selected. For example, a cursor for selecting an application is positioned at the first application.

As a result of the above process up to step S10, the content reproducing device 200 and the terminal device 100 are set in a synchronized state in which the content reproducing device 200 and the terminal device 100 share the sources of the content reproducing device 200 and the applications of the terminal device 100 with each other.

In next step S11, the content reproducing device 200 receives an input operation from the user for giving an instruction to make a transition to a voice recognition mode. This input is performed to the input section 209 of the content reproducing device 200. After the input operation for giving the instruction to make a transition to the voice recognition mode is received, a request to make a transition to the voice recognition mode is made from the content reproducing device 200 to the terminal device 100 in next step S12.

In next step S13, the terminal device 100 makes a transition to the voice recognition mode according to the request from the content reproducing device 200. When the terminal device 100 has made a transition to the voice recognition mode, the voice recognizing section 109 is turned on. Further, a source of voice input to the voice recognizing section 109 is changed from the microphone 112 to the communicating section 107. Thereby, the terminal device 100 can be operated by voice input from the content reproducing device 200 via the communicating section 107 rather than voice input to the microphone 112. The content reproducing device 200 therefore functions as a voice input source for the terminal device 100.

In next step S14, the terminal device 100 notifies the content reproducing device 200 that the transition to the voice recognition mode has been made. Then, in step S15, receiving the notification that the transition to the voice recognition mode has been made, the content reproducing device 200 makes a transition to a voice obtaining mode, turns on the microphone 214, and starts to obtain voice. In this state, the user inputs the name of an application desired to be started, a keyword, or the like to the microphone 214 of the content reproducing device 200 by voice.

When the microphone 214 of the content reproducing device 200 obtains voice from the user, the sound DSP 215 subjects the audio signal to noise cancelling processing. Then, in step S16, the content reproducing device 200 transmits the audio signal to the terminal device 100 via the communicating section 210.

In next step S17, the voice recognizing section 109 of the terminal device 100 extracts a keyword by subjecting the audio signal to voice recognition processing. Keyword information indicating a result of the extraction is supplied to the application processor 110. Then, in step S18, the application executing section 125 of the application processor 110 starts an application corresponding to the supplied keyword.

In addition, when the application executing section 125 is supplied with a keyword from the voice recognizing section 109 after starting the application, the application executing section 125 performs an operation of the application which operation corresponds to the keyword. As described above, a method for operating the application on the basis of the keyword, for example, keywords corresponding to operations of the application are retained as a table in advance, and the table is referred to perform the operation corresponding to the keyword.

For example, in a case of an application for navigation, the application is started by inputting a voice "navigation," and thereafter a keyword indicating a destination "Tokyo Station" is input by voice. Then, the application for navigation starts navigation from the present location of the user to Tokyo Station.

Incidentally, when instructions to start an application and operate the application are given by voice input, a keyword for giving the instruction to start the application and a keyword for giving the instruction to operate the application, such as "Navigation, Tokyo Station" or the like, may be allowed to be input consecutively.

In addition, in a case where an application to be used by the user has already been started, it suffices to input only an operation desired to be performed by the application by voice without performing voice input for starting the application.

For example, when a radio application is already started, and a keyword indicating a radio station such as "FM79.5" or the like is input by voice, the radio application is tuned to "FM79.5 MHz."

In addition, when an application for a moving image sharing site is started, and a keyword as a search object such as "The Beatles" or the like is input by voice, the application for the moving image sharing site searches for "The Beatles," presents a search result, and reproduces a moving image.

Thus, according to the present technology, an application of the terminal device 100 can be started and operated by performing voice input to the content reproducing device 200. For example, when the user is driving in a vehicle, the user cannot operate the terminal device 100 such as a smart phone or the like. However, in the case where the content reproducing device 200 is a car audio device, even when the user is driving in the vehicle, the present technology enables the user to operate the terminal device 100 by voice input to the content reproducing device 200.

In addition, noise cancelling processing applied to the audio signal transmitted to the terminal device 100 enables the terminal device 100 to be used without a decrease in a voice recognition rate of the terminal device 100 even under a noise environment such as the inside of a car or the like.

The user possessing the terminal device such as a smart phone or the like can use a voice recognition function with a relatively inexpensive audio device without purchasing an expensive audio device including a module for voice recognition.

Further, the starting of an application and a process based on a keyword may be performed by voice input of only a keyword indicating an operation desired to be performed by the application without performing voice input for starting the application. Specifically, when a keyword is input by voice, the terminal device determines a most suitable application for performing an operation corresponding to the keyword, automatically starts the application, and thereafter performs the operation based on the keyword.

Incidentally, as described above, the terminal device 100 and the content reproducing device 200 share information on the applications possessed by both the devices with each other. Accordingly, as in updating display on the basis of the shared information and selection information in step S10, the display control section 124 of the terminal device 100 preferably displays information indicating an application started by a keyword on the display section 106. Further, the display control section 218 of the content reproducing device 200 preferably displays the application started in the terminal device 100 on the display section 211. The user can thereby confirm the started application by looking at the display section 106 of the terminal device 100.

In addition, the terminal device 100 and the content reproducing device 200 share information on the applications possessed by both the devices with each other. Thus, the terminal device 100 and the content reproducing device 200 grasp the applications possessed by both the devices, and as shown in FIG. 9, both of the terminal device 100 and the content reproducing device 200 display the applications of both the devices. Therefore, an application of the content reproducing device 200 may be started and operated by operation on the terminal device 100 by transmitting operating information from the terminal device 100 to the content reproducing device 200 according to an input operation on the input section 105 of the terminal device 100. In addition, a voice input to the content reproducing device 200 may be transmitted to the terminal device 100, and the application processor 110 of the terminal device 100 may perform processing corresponding to the input voice, and instruct the content reproducing device 200 to start or operate an application. Thereby applications of the terminal device 100 and the content reproducing device 200 are started and operated seamlessly, so that the user can use an application without being aware of which device is the device.

Operating the terminal device 100 such as a' portable telephone, a smart phone, or the like while driving a vehicle is prohibited by law. Accordingly, the content reproducing device 200 is used as a car audio system in a vehicle, and an application of the terminal device 100 is started/operated by voice input to the content reproducing device 200. This enables an application in the terminal device 100 to be started/operated without the terminal device 100 or the content reproducing device 200 being operated directly.

2. Examples of Modification

One embodiment of the present technology has been concretely described above. However, the present technology is not limited to the foregoing embodiment, but is susceptible of various kinds of modifications based on technical ideas of the present technology.

In the embodiment, the first device is the content reproducing device 200, and the second device is the terminal device 100. However, concrete devices are not limited to this. The present technology can be applied to any devices as long as the devices are capable of two-way communication. For example, both of the first device and the second device may be the terminal device 100 such as a portable telephone, a smart phone, a tablet terminal, or the like. In addition, there may be a combination of a television receiver as one device and the terminal device 100 as another device.

Incidentally, the present technology can also adopt the following constitutions.
(1) An apparatus comprising:
a receiver configured to receive a voice signal and information from a second apparatus;
a shared information unit configured to create shared information shared by both the apparatus and the second apparatus based on the information received from the second apparatus;
a transmitter configured to transmit the shared information to the second apparatus;
a voice recognition unit configured to analyze the voice signal; and
an application execution unit configured to execute an application based on a result generated by the voice recognition unit.
(2) The apparatus according to (1), further comprising:
an input device configured to receive a command from a user to enter a voice recognition mode.
(3) The apparatus according to (1) or (2), wherein the application execution unit further operates the application based on voice commands recognized by the voice recognition unit.
(4) The apparatus according to (1) to (3), wherein the voice recognition unit performs noise canceling processing on the voice signal.
(5) The apparatus according to (1) to (4), wherein the voice signal is detected by a microphone in the second apparatus.
(6) The apparatus according to (1) to (5), the shared information unit creates the shared information by combining information from the apparatus with information from the second apparatus.

(7) The apparatus according to (6), wherein the shared information unit creates the shared information including a list of applications, the shared information unit creating the list of applications including applications on the apparatus and applications on the second apparatus.

(8) The apparatus according to (7), further comprising:
a display control section configured to control a display to display the list of applications.

(9) The apparatus according to (8), wherein the display control section controls the display to display an icon representing each application in the list of applications.

(10) The apparatus according to (9), wherein the application execution unit executes an application corresponding to an icon selected by a user.

(11) The apparatus according to (10), wherein the transmitter transmits a command to the second apparatus to execute the application corresponding to the icon selected by the user when the application corresponding to the icon selected by the user is on the second apparatus.

(12) A system comprising:
the apparatus according to (1) to (11); and
the second apparatus including
a voice input unit configured to detect a voice and to generate the voice signal;
a transmitter configured to transmit a command to enter a voice recognition mode and the voice signal generated by the voice input unit to the apparatus; and
a receiver configured to receive the shared information from the apparatus.

(13) A method performed by the apparatus of (1) to (11), the method comprising:
receiving the voice signal and information from the second apparatus;
creating the shared information shared by both the apparatus and the second apparatus based on the information received from the second apparatus;
transmitting the shared information to the second apparatus;
analyzing the voice signal; and
executing the application based on the result generated by the voice recognition unit.

(14) A non-transitory computer readable medium encoded with a program that, when loaded on a processor of the apparatus according to (1) to (11), causes the processor to perform a method comprising:
receiving the voice signal and information from the second apparatus;
creating the shared information shared by both the apparatus and the second apparatus based on the information received from the second apparatus;
transmitting the shared information to the second apparatus;
analyzing the voice signal; and
executing the application based on the result generated by the voice recognition unit.

(15) An apparatus comprising:
a voice input unit configured to detect a voice;
a transmitter configured to transmit a command to enter a voice recognition mode and a voice signal generated by the voice input unit to a second apparatus; and
a receiver configured to receive shared information from the second apparatus.

(16) The apparatus according to (15), wherein the receiver receives the shared information including a list of applications including applications on the apparatus and applications on the second apparatus.

(17) The apparatus according to (15) to (16), further comprising:
a display control section configured to control a display to display an icon representing each application in the list of applications.

(18) The apparatus according to (15) to (17), further comprising:
an application execution unit executes an application corresponding to an icon selected by a user.

(19) A method performed by the apparatus according to (15) to (18), the method comprising:
detecting the voice;
transmitting the command to enter the voice recognition mode and the voice signal generated by the voice input unit to the second apparatus; and
receiving the shared information from the second apparatus.

(20) A non-transitory computer readable medium encoded with a program that, when loaded on a processor of the apparatus according to (15) to (18), causes the processor to perform a method comprising:
detecting the voice;
transmitting the command to enter the voice recognition mode and the voice signal generated by the voice input unit to the second apparatus; and
receiving the shared information from the second apparatus.

(21) An information processing device operating in a second device, the second device being connected to a first device and including a voice recognizing section for extracting a keyword from audio transmitted from the first device, the information processing device including:
an information obtaining section configured to obtain first application information indicating an application possessed by the first device via a communicating section in the second device;
a shared information generating section configured to generate shared information to be shared by the first device and the second device on a basis of the first application information obtained by the information obtaining section;
a transmission control section configured to transmit the shared information to the first device via the communicating section; and
an application executing section configured to execute an application on a basis of the keyword supplied from the voice recognizing section.

(22) The information processing device according to the above (21),
wherein the application executing section starts the application on the basis of the keyword.

(23) The information processing device according to the above (21) or (22),
wherein the application executing section operates the application on the basis of the keyword.

(24) The information processing device according to any one of the above (21) to (23),
wherein the audio transmitted from the first device has been subjected to noise canceling processing.

(25) The information processing device according to any one of the above (21) to (24),
wherein the second device has a microphone for obtaining audio, and
the application executing section changes input audio from the audio supplied from the microphone to the audio transmitted from the first device.

(26) The information processing device according to any one of the above (21) to (25), wherein the information obtaining section further obtains second application information indicating applications possessed by the second device, and the shared information generating section generates the shared information on a basis of the first application information and the second application information.

(27) The information processing device according to any one of the above (21) to (26), wherein the second application information is information indicating an application selected by a user from the applications possessed by the second device.

(28) The information processing device according to any one of the above (21) to (27), further including a display control section configured to perform display control of the application on a display section included in the second device on a basis of the shared information.

(29) The information processing device according to any one of the above (21) to (28), wherein the display control section performs display control such that the display section displays icons representing an application selected by a user from applications possessed by the second device and the application possessed by the first device.

(30) An information processing method in a second device, the second device being connected to a first device and including a voice recognizing section for extracting a keyword from audio transmitted from the first device, the information processing method including:

obtaining first application information indicating an application possessed by the first device via a communicating section in the second device;

generating shared information to be shared by the first device and the second device on a basis of the first application information obtained by the information obtaining section;

transmitting the shared information to the first device via the communicating section; and executing an application on a basis of the keyword supplied from the voice recognizing section.

(31) An information processing program for making a computer perform an information processing method in a second device, the second device being connected to a first device and including a voice recognizing section for extracting a keyword from audio transmitted from the first device, the information processing method including:

obtaining first application information indicating an application possessed by the first device via a communicating section in the second device;

generating shared information to be shared by the first device and the second device on a basis of the first application information obtained by the information obtaining section;

transmitting the shared information to the first device via the communicating section; and executing an application on a basis of the keyword supplied from the voice recognizing section.

(32) A terminal device including:

a voice recognizing section configured to extract a keyword from audio transmitted from another device connected to the terminal device;

an information obtaining section configured to obtain first application information indicating an application possessed by the other device via a communicating section in the second device;

a shared information generating section configured to generate shared information to be shared by the first device and the second device on a basis of the first application information obtained by the information obtaining section;

a transmission control section configured to transmit the shared information to the first device via the communicating section; and an application executing section configured to execute an application on a basis of the keyword supplied from the voice recognizing section.

EXPLANATION OF REFERENCE NUMERALS

100 . . . Terminal device
105 . . . Input section
106 . . . Display section
107 . . . Communicating section
109 . . . Voice recognizing section
110 . . . Application processor
121 . . . Information obtaining section
122 . . . Shared information generating section
123 . . . Transmission control section
124 . . . Display control section
125 . . . Application executing section
200 . . . Content reproducing device
209 . . . Input section
210 . . . Communicating section
211 . . . Display section
214 . . . Microphone
216 . . . Application processor
217 . . . Information obtaining section
218 . . . Display control section

The invention claimed is:

1. A first apparatus comprising:
an antenna configured to receive signals and information from a second apparatus and transmit information to the second apparatus; and
one or more processors configured to:
receive, via the antenna, a voice signal and operation information from the second apparatus;
create shared information based on the operation information received from the second apparatus,
wherein the shared information is shared by the first apparatus and the second apparatus, and
wherein the shared information indicates a plurality of first applications of the first apparatus and a plurality of second applications of the second apparatus;
transmit, via the antenna, the shared information to the second apparatus;
recognize the received voice signal to generate a result;
control, on a display device of the first apparatus, a movement of a first icon to a position of a second icon based on a first selection of the first icon at a first time instant that is subsequent to a second selection of the second icon at a second time instant;
operate at least one application of the plurality of first applications and the plurality of second applications based on the generated result; and
transmit, via the antenna, a first command to the second apparatus to operate the at least one application corresponding to the first icon, and wherein the first command is transmitted based on the at least one application that is installed on the second apparatus.

2. The first apparatus according to claim 1, further comprising an input device configured to receive a user command to enter a voice recognition mode.

3. The first apparatus according to claim 1, wherein the one or more processors are further configured to operate the at least one application of the plurality of first applications and the plurality of second applications based on the recognized voice signal.

4. The first apparatus according to claim 1, wherein the one or more processors are further configured to cancel noise in the received voice signal.

5. The first apparatus according to claim 1, wherein the voice signal is received by a microphone in the second apparatus.

6. The first apparatus according to claim 1, wherein the one or more processors are further configured to create the shared information based on a combination of first information from the first apparatus and second information from the second apparatus.

7. The first apparatus according to claim 1, wherein the one or more processors are further configured to control the display device to display the shared information.

8. The first apparatus according to claim 7, wherein the one or more processors are further configured to control the display device to display the first icon representing the at least one application of the plurality of first applications and the plurality of second applications associated with the shared information.

9. The first apparatus according to claim 8, wherein the one or more processors are further configured to operate the at least one application corresponding to the first icon, wherein the first icon is selected from a plurality of icons, and wherein the plurality of icons correspond to the plurality of first applications and the plurality of second applications.

10. The first apparatus according to claim 1, wherein the one or more processors are further configured to operate the at least one application based on a keyword that is recognized from the voice signal.

11. A system comprising:
a first apparatus including:
a first antenna configured to receive signals and information from a second apparatus and transmit information and commands to the second apparatus; and
a first set of processors configured to:
receive, via the first antenna, a voice signal and operation information from the second apparatus;
create shared information based on the operation information received from the second apparatus,
wherein the shared information is shared by the first apparatus and the second apparatus, and
wherein the shared information indicates a plurality of first applications of the first apparatus and a plurality of second applications of the second apparatus;
transmit, via the first antenna, the shared information to the second apparatus;
recognize the received voice signal to generate a result;
control, on a display device of the first apparatus, a movement of a first icon to a position of a second icon based on a first selection of the first icon at a first time instant that is subsequent to a second selection of the second icon at a second time instant;
operate at least one application of the plurality of first applications and the plurality of second applications based on the generated result; and
transmit, via the first antenna, a first command to the second apparatus to operate the at least one application corresponding to the first icon, and wherein the first command is transmitted based on the at least one application that is installed on the second apparatus; and
the second apparatus including:

a second antenna configured to transmit signals and information to the first apparatus and receive information and commands from the first apparatus;
a second set of processors configured to:
generate the voice signal based on reception of a voice input; and
transmit, via the second antenna, a second command and the generated voice signal to the first apparatus, wherein the second command is configured to enter a voice recognition mode; and
receive, via the second antenna, the shared information from the first apparatus.

12. A method, comprising:
in a first apparatus:
receiving a voice signal and operation information from a second apparatus;
creating shared information based on the operation information received from the second apparatus,
wherein the shared information is shared by the first apparatus and the second apparatus,
wherein the shared information indicates a plurality of first applications of the first apparatus and a plurality of second applications of the second apparatus;
transmitting the shared information to the second apparatus;
recognizing the received voice signal to generate a result;
controlling, on a display device of the first apparatus, a movement of a first icon to a position of a second icon based on a first selection of the first icon at a first time instant that is subsequent to a second selection of the second icon at a second time instant; and
operating at least one application of the plurality of first applications and the plurality of second applications based on the generated result,
transmitting, via an antenna, a command to the second apparatus to operate the at least one application corresponding to the first icon, and wherein the command is transmitted based on the at least one application that is installed on the second apparatus.

13. A non-transitory computer-readable medium having stored thereon, computer-executable instructions which when executed by a first apparatus, cause the first apparatus to execute operations, the operations comprising:
receiving a voice signal and operation information from a second apparatus;
creating shared information based on the operation information received from the second apparatus,
wherein the shared information is shared by the first apparatus and the second apparatus,
wherein the shared information indicates a plurality of first applications of the first apparatus and a plurality of second applications of the second apparatus;
transmitting the shared information to the second apparatus;
recognizing the received voice signal to generate a result;
controlling, on a display device of the first apparatus, a movement of a first icon to a position of a second icon based on a first selection of the first icon at a first time instant that is subsequent to a second selection of the second icon at a second time instant; and
operating at least one application of the plurality of first applications and the plurality of second applications based on the generated result,
transmitting, via an antenna, a command to the second apparatus to operate the at least one application corresponding to the first icon, and wherein the command is transmitted based on the at least one application that is installed on the second apparatus.

14. A first apparatus, comprising:

an antenna configured to send signals to a second apparatus and receive information from the second apparatus;

one or more processors configured to:
  generate a voice signal based on reception of a voice input;
  transmit, via the antenna, a first command to enter a voice recognition mode and the generated voice signal to a second apparatus;
  receive, via the antenna, shared information from the second apparatus,
  wherein the shared information indicates a plurality of first applications of the first apparatus and a plurality of second applications of the second apparatus; and
  control, on a display device of the first apparatus, a movement of a first icon to a position of a second icon based on a first selection of the first icon at a first time instant that is subsequent to a second selection of the second icon at a second time instant
  operate at least one application of the plurality of first applications and the plurality of second applications,
  transmit, via the antenna, a second command to the second apparatus to operate the at least one application corresponding to the first icon, and wherein the second command is transmitted based on the at least one application that is installed on the second apparatus.

15. The first apparatus according to claim 14, wherein the one or more processors are further configured to control the display device of the first apparatus to display the first icon representing at least one application of the plurality of first applications and the plurality of second applications associated with the shared information.

16. The first apparatus according to claim 15, wherein the one or more processors are further configured to operate the at least one application corresponding to the first icon of the plurality of icons.

17. A method, comprising:
  in a first apparatus:
    generating a voice signal based on reception of a voice input;
    transmitting a first command and the generated voice signal to a second apparatus, wherein the first command is configured to enter a voice recognition mode;
    receiving shared information from the second apparatus,
    wherein the shared information indicates a plurality of first applications of the first apparatus and a plurality of second applications of the second apparatus; and
    controlling, on a display device of the first apparatus, a movement of a first icon to a position of a second icon based on a first selection of the first icon at a first time instant that is subsequent to a second selection of the second icon at a second time instant
    operating at least one application of the plurality of first applications and the plurality of second applications,
    transmitting, via an antenna, a second command to the second apparatus to operate the at least one application corresponding to the first icon, and wherein the second command is transmitted based on the at least one application that is installed on the second apparatus.

18. A non-transitory computer-readable medium having stored thereon, computer-executable instructions which when executed by a first apparatus, cause the first apparatus to execute operations, the operations comprising:
  generating a voice signal based on reception of a voice input;
  transmitting a first command and the generated voice signal to a second apparatus, wherein the first command is configured to enter a voice recognition mode;
  receiving shared information from the second apparatus,
  wherein the shared information indicates a plurality of first applications of the first apparatus and a plurality of second applications of the second apparatus; and
  controlling, on a display device of the first apparatus, a movement of a first icon to a position of a second icon based on a first selection of the first icon at a first time instant that is subsequent to a second selection of the second icon at a second time instant
  operating at least one application of the plurality of first applications and the plurality of second applications,
  transmitting, via an antenna, a second command to the second apparatus to operate the at least one application corresponding to the first icon, and wherein the second command is transmitted based on the at least one application that is installed on the second apparatus.

* * * * *